United States Patent
Burns

(10) Patent No.: US 10,951,426 B2
(45) Date of Patent: Mar. 16, 2021

(54) DEVICES, SYSTEMS AND METHODS FOR PERFORMING MAINTENANCE IN DOCSIS CUSTOMER PREMISE EQUIPMENT (CPE) DEVICES

(71) Applicant: INTERDIGITAL CE PATENT HOLDINGS, Paris (FR)

(72) Inventor: James Burns, Dacula, GA (US)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/393,114

(22) Filed: Apr. 24, 2019

(65) Prior Publication Data

US 2019/0334732 A1 Oct. 31, 2019

Related U.S. Application Data

(60) Provisional application No. 62/663,048, filed on Apr. 26, 2018.

(51) Int. Cl.
*H04L 12/12* (2006.01)
*H04L 12/28* (2006.01)

(52) U.S. Cl.
CPC .......... *H04L 12/12* (2013.01); *H04L 12/2801* (2013.01)

(58) Field of Classification Search
None
See application file for complete search history.

(56) References Cited

U.S. PATENT DOCUMENTS

| | | | |
|---|---|---|---|
| 7,587,746 B1 | 9/2009 | Schwartzman et al. | |
| 8,553,848 B1 | 10/2013 | Mohr | |
| 8,687,535 B2 | 4/2014 | Ling et al. | |
| 9,106,970 B1 | 8/2015 | Beser | |
| 2002/0100057 A1* | 7/2002 | Brown | H03J 1/0091 725/111 |
| 2002/0101883 A1* | 8/2002 | Ruszczyk | H04L 27/34 370/503 |
| 2002/0111169 A1* | 8/2002 | Vanghi | H04W 76/15 455/436 |
| 2005/0076385 A1* | 4/2005 | Li | H04N 7/17309 725/111 |

(Continued)

FOREIGN PATENT DOCUMENTS

| | | |
|---|---|---|
| EP | 1396948 A2 | 3/2004 |
| EP | 1819152 A2 | 8/2007 |
| EP | 2337264 | 12/2010 |

*Primary Examiner* — Joshua Joo
(74) *Attorney, Agent, or Firm* — Jerome G. Schaefer

(57) ABSTRACT

Devices, systems and methods for performing maintenance in Data over Cable Service Interface Specification (DOCSIS) network CPE devices and for improving recovery to a normal operating state from maintenance are provided. The devices, systems and methods provide for entering a standby mode for an electronic device for a duration of a maintenance period. A currently-used RF communication channel frequency of the electronic device is stored as a last known channel frequency into a memory. RF communication channel operation between the electronic device and an upstream content distribution device is suspended for the duration of the maintenance period. After the maintenance period, the last known channel frequency is used to reestablish a communication connection between the electronic device and the upstream content distribution device.

18 Claims, 7 Drawing Sheets

(56) References Cited

U.S. PATENT DOCUMENTS

| | | | | |
|---|---|---|---|---|
| 2007/0218861 A1* | 9/2007 | Walston | ............ | H04W 52/0216 |
| | | | | 455/343.4 |
| 2014/0068040 A1* | 3/2014 | Neti | ........................ | G06F 9/485 |
| | | | | 709/223 |
| 2015/0249738 A1* | 9/2015 | Gottlieb | ................... | H04M 3/24 |
| | | | | 379/22 |
| 2016/0057722 A1* | 2/2016 | Premy | ............... | H04W 56/0015 |
| | | | | 370/315 |
| 2016/0212473 A1* | 7/2016 | Zhuang | ............... | H04L 12/2801 |
| 2017/0083072 A1* | 3/2017 | Dauneria | .............. | H04W 24/00 |
| 2017/0322794 A1* | 11/2017 | Ferlitsch | ................... | G06F 8/65 |
| 2019/0004857 A1* | 1/2019 | Matsuyama | .......... | G06F 9/4887 |
| 2019/0190589 A1* | 6/2019 | Montsma | ............ | H04B 7/1858 |

* cited by examiner

DEVICES, SYSTEMS AND METHODS FOR PERFORMING MAINTENANCE IN DOCSIS CUSTOMER PREMISE EQUIPMENT (CPE) DEVICES

CROSS REFERENCE TO RELATED APPLICATIONS

This application claims the benefit of U.S. provisional patent application No. 62/663,048 filed 26 Apr. 2018, the contents of which are incorporated by reference herein in the entirety for all purposes.

TECHNICAL FIELD

The present disclosure generally relates to home networking systems and customer premise equipment (CPE) devices. More particularly, the present disclosure relates to devices, systems and methods for performing maintenance in Data over Cable Service Interface Specification (DOCSIS) network CPE devices and for improving recovery to a normal operating state from maintenance.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Today, modems, such as cable modems, offer Internet connectivity to subscribers' homes. These modems are typically connected to an information distribution network, such as a coaxial cable network, an optical fiber network, a hybrid fiber/coaxial cable network, or a wireless network, and communicate with a network device outside the home (e.g., a termination system, such as a cable modem termination server, or CMTS). Within the home, the modem may be connected to an in-home network, such as an Ethernet network, an in-home coaxial cable network (e.g., per the Multimedia Over Coax Alliance—MoCA—specification), wireless network, etc., and various devices within the home may use that network to ultimately communicate with network devices outside the home. Additionally, the modem may provide telephone services to the home (e.g., Voice over IP (VoIP) services). Such multi-function modems are commonly referred to as a gateway or gateway device.

In a data over cable system interface specification (DOCSIS) network, periodic maintenance and repairs of the network upstream from the home or premise are required, e.g., rerouting of fiber and/or RF cables, replacement of transmission gear, etc. This is usually done by the service provider (SP) during a maintenance window, e.g., between midnight and 06:00 hours, to minimize the disruptions to customers. During maintenance, the RF signal is turned off by a headend, e.g., cable modem termination server, or CMTS, but the CPE device may have limited functionality, e.g., LAN routing. At the end of the maintenance period, the RF transmission from the headend recommences and the CPE device is left to try to search for the proper RF channel, among other tasks. In the DOCSIS standard, loss of lock on the downstream (i.e., forward) signal will result in customer premise equipment (CPE) devices, e.g., cable modem (CM) components, scanning for a valid DOCSIS channel. Such scans can be very slow in finding a valid DOCSIS channel. This can result in a problem that CMs can stay offline after the RF is restored and can result in calls to customer service representatives (CSR) to report the outage. Another problem that arises is how to notify a customer that a maintenance interval is active if the customer wants to access any of the services that the CPE device, e.g., a CM, a set-top box (STB), a gateway, etc., provides such as Internet access, WiFi, telephone, or program content services.

Therefore, a need exists for techniques for placing a CPE device in a standby state and improving recovery of the CPE device to a normal operating state from the standby state after a maintenance period.

SUMMARY

Devices, systems and methods for performing maintenance in Data over Cable Service Interface Specification (DOCSIS) network CPE devices and for improving recovery to a normal operating state from the maintenance are provided.

According to one aspect of the present disclosure, a method is provided including entering a standby mode for an electronic device for a duration of a maintenance period; storing a currently-used RF communication channel frequency as a last known channel frequency into non-volatile memory; suspending RF communication channel operation between the electronic device and an upstream content distribution device for the duration of the maintenance period; and using the last known channel frequency to reestablish a communication connection between the electronic device and the upstream content distribution device after the maintenance period.

According to another aspect of the present disclosure, a device is provided including a controller that enters a standby mode for a duration of a maintenance period; and a tuner that determines a currently-used RF communication channel frequency and stores the currently-used RF communication channel frequency as a last known channel frequency into non-volatile memory; wherein the controller suspends RF communication channel operation with an upstream content distribution device for the duration of the maintenance period, and the tuner uses the last known channel frequency to reestablish a communication connection with the upstream content distribution device after the maintenance period.

BRIEF DESCRIPTION OF THE DRAWINGS

These, and other aspects, features and advantages of the present disclosure will be described or become apparent from the following detailed description of the embodiments, which is to be read in connection with the accompanying drawings.

Figure 1:
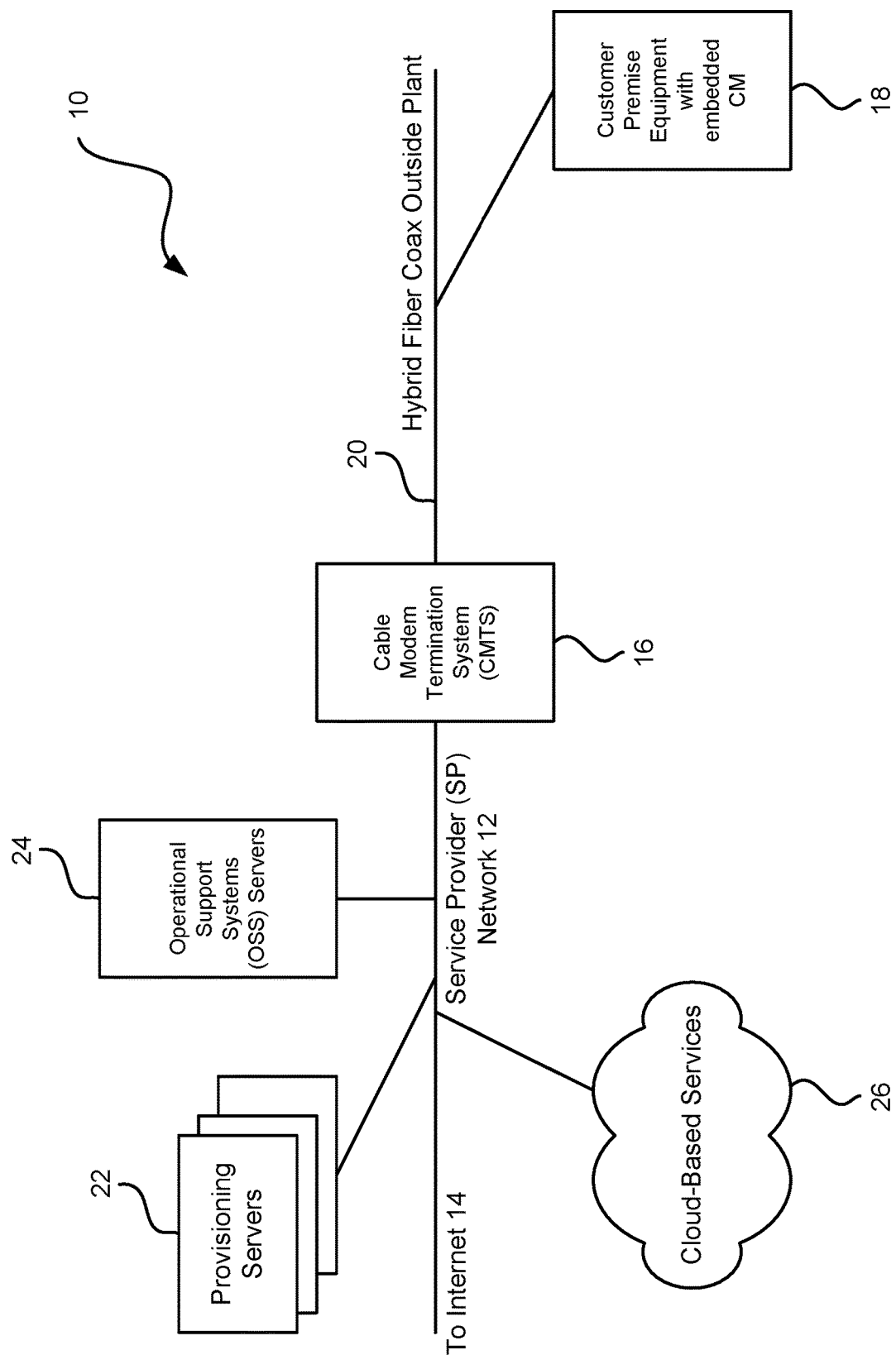
FIG. 1 is a block diagram of an exemplary content delivery system in accordance with an embodiment of the present disclosure.

It should be understood that the drawing(s) are for purposes of illustrating the concepts of the disclosure and is not necessarily the only possible configuration for illustrating the disclosure.

DESCRIPTION OF EMBODIMENTS

It also should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Devices, systems and methods for performing maintenance in Data over Cable Service Interface Specification (DOCSIS) network CPE devices and for improving recovery to a normal operating state from the maintenance are provided. The present disclosure provides for placing an electronic device, e.g., a cable modem (CM) into a 'standby' state at a specified time for a specified duration. CMs can be single cable modems, cable modems with an embedded media terminal adapters (eMTA), cable gateways with Ethernet, WiFi, MoCA and voice interfaces, set-top boxes (STB) with an embedded CM, and plant equipment with an embedded CM. By placing the electronic device into a known state for a predefined period of time, both a recovery period and a customer experience are improved. This can also result in a cost savings for an operator, e.g., a service operator, who does not have to send a maintenance technician to discover the outage was planned, and for customer service to include this in an interactive voice response (IVR) that most operators are using to direct incoming calls.

In addition to the simple benefit above, the electronic device, e.g., a CM, gateway device, set-top box, etc., may also have some enhanced operational options such as: 1) Local area network (LAN) interfaces may have browser (HTTP) traffic redirected to an internal server to message the end user of the outage and duration of the outage; 2) if the CM is part of a gateway (GW) with wireless services, a hotspot or community WiFi may also be disabled, so that client devices will not connect to the interface and not have Internet access; 3) cloud-based GW services may be suspended or properly conditioned to reflect the network outage; 4) telephony service from an embedded media terminal adapter (eMTA) may send a disconnect to a call server to suspend the telephony service provided by the electronic device; and 5) the telephony service from an embedded media terminal adapter (eMTA) may have a conditioned response to an off-hook condition with a tone or pre-recorded message in place of dial tone.

An exemplary content delivery system 10 in accordance with an embodiment of the present disclosure is illustrated in FIG. 1. System 10 includes a service provider network 12 coupled to the Internet 14 and to a cable modem termination system (CMTS) 16 for providing various services to a customer premise equipment (CPE) device 18, e.g., a single cable modem (CM), a cable modem with embedded media terminal adapters (eMTA), a cable gateway with Ethernet, WiFi, MoCA and voice interfaces, a set-top box (STB) with an embedded CM, and plant equipment with an embedded CM, etc. The CPE device 18 may be coupled to the CMTS 16 via a hybrid fiber coax connection 20. The service provider network 12 further includes provisioning servers 22 and operational support systems (OSS) servers 24. The provisioning servers 22 may provide 1) Time of Day (ToD) to the CPE device(s) 18, 2) IP address(es) for the device(s) 18, 3) files used for the provisioning of individual cable modems, with parameter such as speed(s), IP filters, UserIDs and Passwords, 4) files for provisioning an embedded media terminal adapter (eMTA), and 5) files for provisioning router gateway (RG) functions. The OSS servers 24 may be used to transmit a start time and duration of a stand-by mode or maintenance period to each connected CPE device 18. Additionally, the OSS servers 24 may provide for IP based communications, including, but not limited to: Hypertext Transfer Protocol (HTTP), Simple Network Management Protocol (SNMP), TR-069 and/or Extensible Markup Language (XML) monitoring and alteration of parameters on the CPE device 18, e.g. a gateway. In such a system 10, certain components may collectively be referred to as a headend, e.g., CMTS 16, provisioning servers 22 and OSS servers 24. In certain configurations, the CMTS 16 may simply be referred to as a headend. Additionally, by providing such as system 10, the CPE devices 18 may have access to cloud-based services 26 on the Internet 14.

Figure 2:
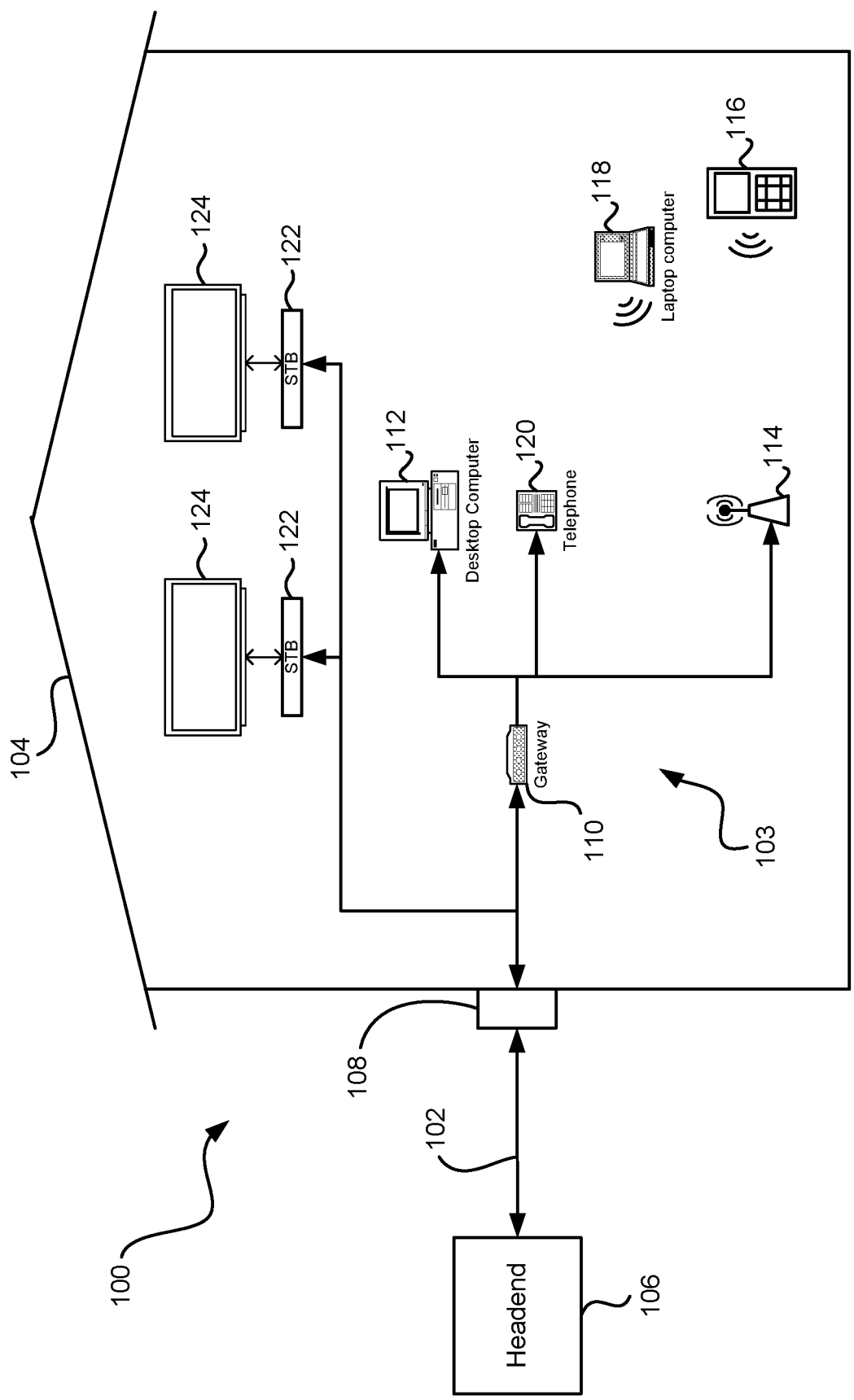
FIG. 2 is a block diagram of an exemplary information distribution network for delivering services to a premise in accordance with the present disclosure.

Turning to FIG. 2, an exemplary information distribution network 100 for a premise 104 is illustrated. Network 100 may be any type of information distribution network, such as satellite, telephone, cellular, wireless network, etc. The example illustrated may be a hybrid fiber/coax distribution network found in many cable television networks. Such networks 100 use a series of interconnected transmission lines 102, such as coaxial cables fiber optic cables, or any other desired transmission medium, to connect multiple premises or homes 104 to a central office or headend 106. The headend 106 may transmit downstream (DS) information signals onto the lines 102, and each home 104 may have a tuner used to receive and process those signals.

The headend 106 may include a server configured to handle communications with the homes 104 using whichever communication medium is available. For example, in a coaxial cable or hybrid fiber/coax system, the headend 106 may include a modem termination system (MTS), such as a cable modem termination system (CMTS) 16 as shown in FIG. 1, which may be a computing device configured to manage communications between devices on the network of lines 102 and backend devices such as content sources (e.g., video on demand servers, television program sources, etc.), headend computers and other networks. The CMTS may be as specified in the Data Over Cable Service Interface Specification (DOCSIS) standard, published by Cable Television Laboratories, Inc. (a.k.a. CableLabs), or it may be a similar or modified device instead. The CMTS may be configured to place data on one or more downstream frequencies to be received by modems or gateways devices at the various premises 104, and to receive upstream communications from those modems or gateways devices on one or more upstream frequencies, as well as to serve as an interface to devices and networks that are further upstream, such as other Internet devices. As described above, in certain embodiments, headend 106 may include provision servers 22 and OSS servers 24. Similar types of headend systems may be used for other types of networks, such as an optical fiber termination system for optical media, telephone line DSLAM (Digital Subscriber Line Access Multiplexer) for telephone lines, satellite transceiver, cellular telephone station, local area wireless (e.g., WiMax), etc.

The premise or home 104 may be connected to the network 100 via an interface 108. In one embodiment, the interface 108 may be the physical demarcation of what is maintained by the Service Provider (SP) and what is generally considered to be part of the home wiring. The interface 108 may include a grounding block and may provide a splitter and/or amplifier to service multiple outlets in the home 104. The interface 108 may be as simple as an F-female to F-female connector with a connection to an earth ground for safety. The transmission line (coaxial, fiber, etc.) may be connected to a home gateway device 110. The gateway device 110 may be a computing device configured to communicate over the network 100 and with the headend 106. The gateway device 110 may include, for example, a modem configured to communicate with the termination system at the headend 106.

The gateway 110 may be connected to a variety of devices within the home forming a home network 103, and may coordinate communications among those devices, and between the devices and networks outside the home 104. For example, the gateway 110 may include a modem (e.g., a DOCSIS device communicating with CMTS), and may offer Internet connectivity to one or more computers 112 within the home. The connectivity may also be extended to one or more wireless routers 114. For example, router 114 may be an IEEE 802.11 router, local cordless telephone (e.g., Digital Enhanced Cordless Telephone—DECT), or any other desired type of wireless network. Various wireless devices within the home, such as a DECT phone 116 (or a DECT interface within a cordless telephone) and portable laptop computer 118, may communicate with the gateway 110 using wireless router 114. It is to be appreciated that the router may be integrated into the gateway 110 eliminating the need for a separate router 114.

The gateway device 110 may also include one or more telephone interfaces, to allow the gateway device 110 to communicate with one or more telephones 120. Telephones 120 may be a traditional analog twisted pair telephone (in which case the gateway device 110 may include a twisted pair interface), or it may be a digital telephone such as a Voice Over Internet Protocol (VoIP) telephone, in which case the phone 120 may simply communicate with the gateway device 110 using a digital interface, such as an Ethernet interface.

The gateway device 110 may communicate with the various devices within the home using any desired connection and protocol. For example, an in-home MoCA (Multimedia Over Coax Alliance) network may use a home's internal coaxial cable network to distribute signals to the various devices in the homes. Alternatively, some or all of the connections may be of a variety of formats (e.g., MoCA, Ethernet, twisted pair, etc.), depending on the particular end device being used. The connections may also be implemented wirelessly, using local WI-FI, WiMax, Bluetooth, or any other desired wireless format.

The incoming line 102 may also be connected to one or more network interface devices 122, which can be set-top boxes (STBs), digital video recorders (DVRs), etc. The STBs 122 may receive and decode content via the line (e.g., optical, coaxial, etc.), and may provide that content to users for consumption, such as for viewing video content on a television 124. Alternatively, televisions, or other viewing devices 124, may be connected to transmission line 102 directly without a STB, and may perform the functions of a STB. Any type of content, such as video, video on demand, audio, Internet data etc., can be accessed in this manner. As an alternative, the STB functionality can be incorporated with the gateway device, so that the gateway device 110 receives and decodes content from the line and supplies it to the televisions for display using any desired local home physical interface, such as an Ethernet or DECT interface.

Figure 3:
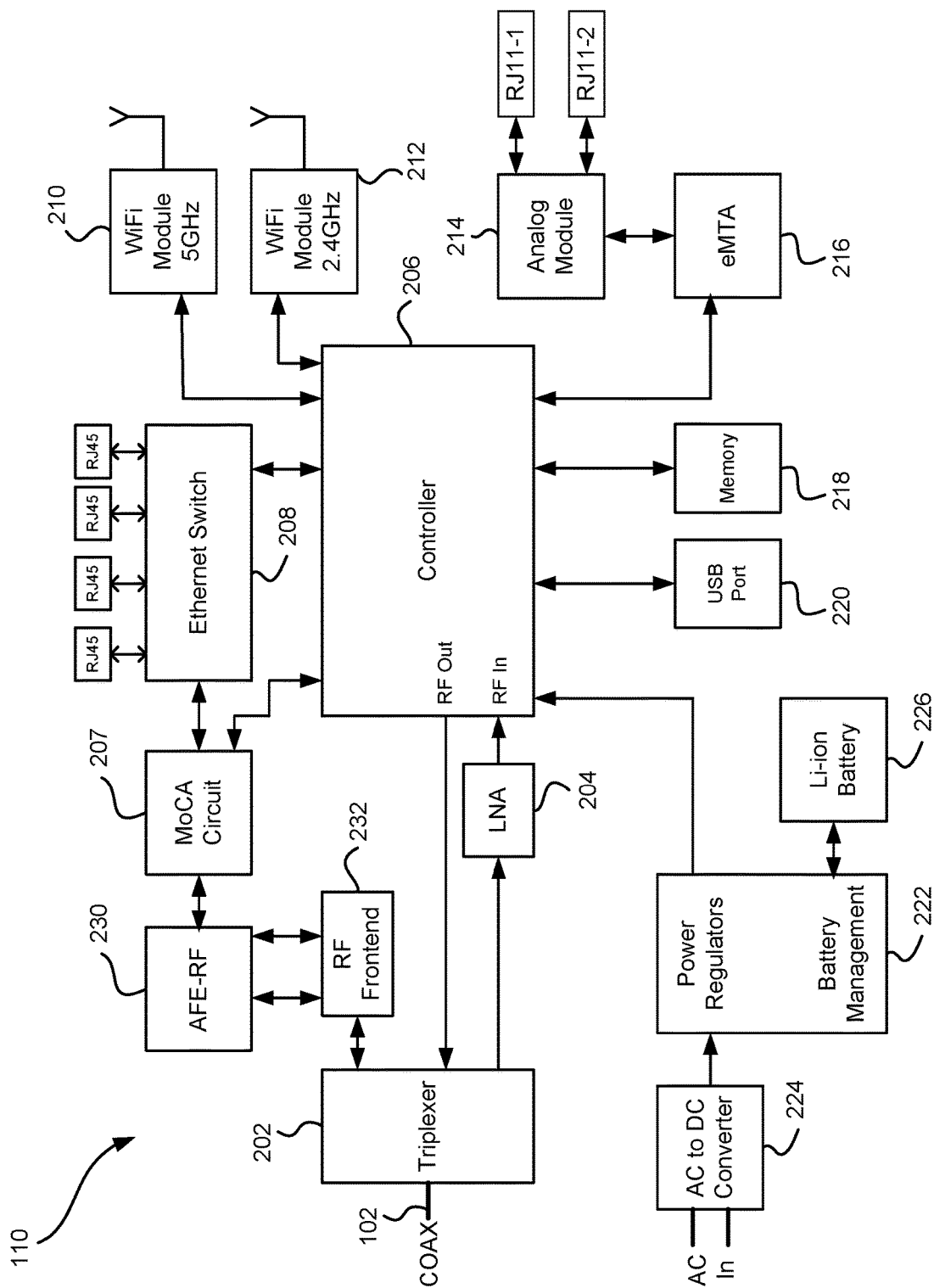
FIG. 3 is a block diagram of an exemplary gateway device in accordance with the present disclosure.

Turning now to FIG. 3, a block diagram of an embodiment of the gateway device 110 is shown. The gateway device 110 includes a triplexer 202 configured for receiving a signal transmitted over transmission line 102. The triplexer 202 provides the received signal to a low noise amplifier (LNA) 204 coupled to an RF In input of controller 206 and to an RF frontend 232. The controller 206 is interconnected via a bus to several of the components of the device 110, including a MoCA circuit 207, Ethernet switch 208, a first WI-FI module 210, a second WI-FI module 212, an embedded media terminal adapter (eMTA) 216, a memory or storage device 218, and a USB port 220. Additionally, the controller 206 is coupled to a battery management module 222 via the bus or other means as is known in the art. The controller 206 manages the conversion process for converting the input stream signal 102 into various services, such as Internet service, telephone service, etc. The controller 206 is further coupled to control memory 218 (e.g., volatile or non-volatile memory, including random access memory, static RAM, dynamic RAM, read only memory, programmable ROM, flash memory, EPROM, EEPROM, etc.) for storing information and instruction code for controller 206. Further, the implementation of the memory may include several possible embodiments, such as a single memory device or, alternatively, more than one memory circuit connected together to form a shared or common memory. Still further, the memory may be included with other circuitry, such as portions of bus communications circuitry, in a larger circuit.

An analog front-end RF (AFE-RF) 230 interfaces to the RF frontend 232 converting the received analog signal 102 to a digital signal for the MoCA circuit 207. The MoCA circuit 207 and Ethernet switch 208 provides audio and video content to devices on the home network 103. The first WI-FI module 210 (operating at 5 GHz) and the second WI-FI module 212 (operating at 2.4 GHz) provide wireless services to devices on the home network 103. It is to be appreciated that the first and second WI-FI modules may act as an access point for the home network eliminating the need for a separate device such as device 114 shown in FIG. 1.

The eMTA 216 provides telephone service to conventional telephones via analog module 214 and RJ11 jacks disposed on a housing of the gateway device 110. A DECT module (not shown) may provide telephone service to DECT compatible telephones and handsets. It is to be appreciated that the analog module 214 and/or eMTA 216 may be employed as voice interface modules for receiving voice data and providing the voice data to the controller 206.

Power is supplied to the gateway device 110 via a conventional power plug and is received by AC-to-DC converter 224. The AC-to-DC converter 224 provides the converted power to the battery management module 222. The battery management module 222 includes at least one power regulator for supplying various voltage levels to the various components of the gateway device 110. The battery management module 222 further provides power to and charges a battery 226, e.g., a Li-ion battery, as long as uninterrupted power is being supplied to the AC-to-DC converter 224. Upon loss of power to the gateway device 110, the battery management module 222 senses the power loss and transmits a signal to the controller 206. Additionally, the battery management module 222 monitors the capacity of the battery 226.

Figure 4:
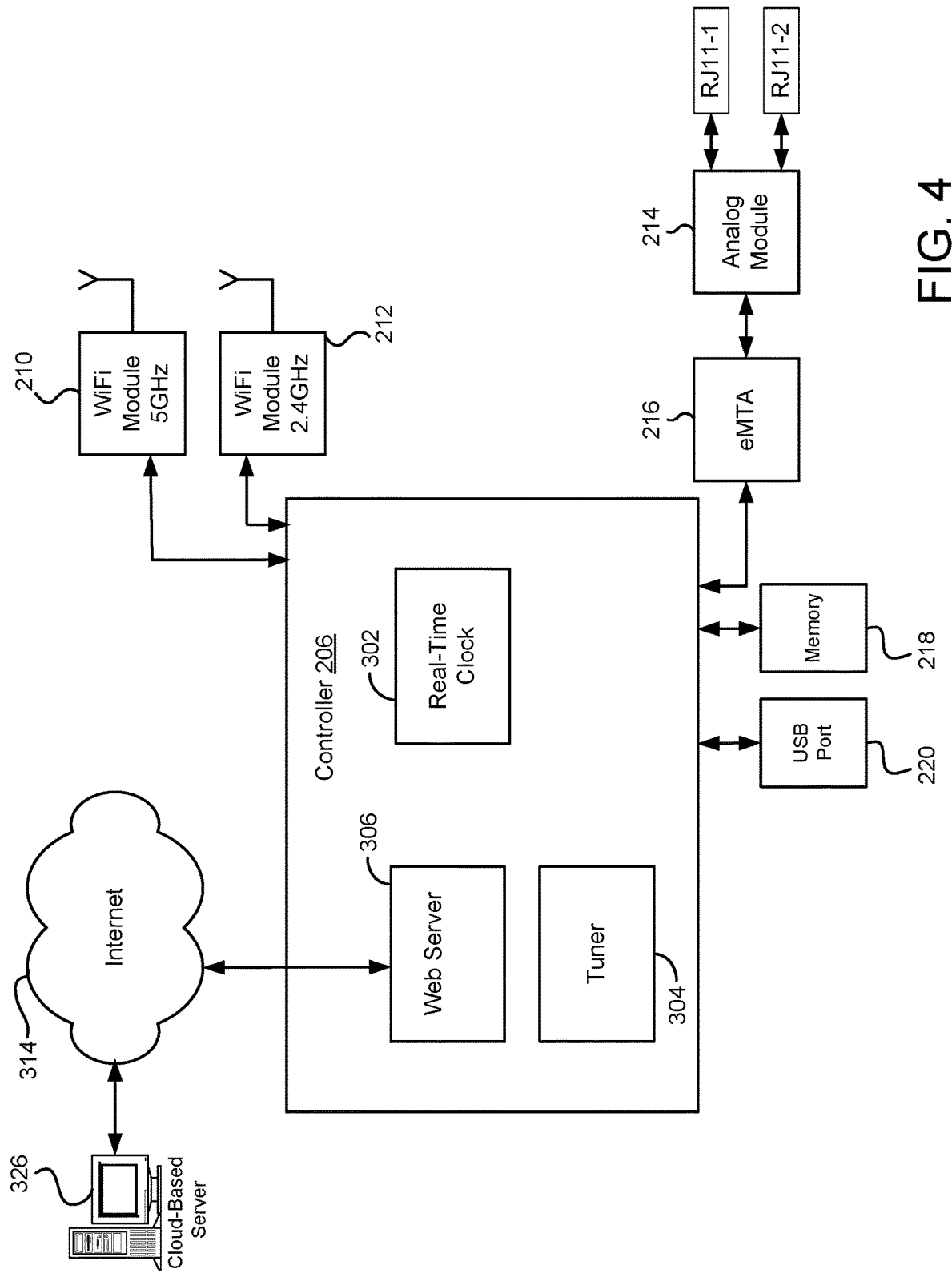
FIG. 4 is a block diagram of an exemplary gateway device for performing maintenance in a data over cable system interface specification (DOCSIS) network in accordance with an embodiment of the present disclosure.

Turning to FIG. 4, a block diagram of an embodiment of a controller 206 in accordance with the present disclosure is shown. The controller 206 includes a real-time clock 302, a tuner 304 and an internal web server 306. The real-time clock 302 provides time to the controller 206 which uses the time to determine the start and duration of the maintenance period or standby mode. The tuner 304 scans a spectrum for a DOCSIS signal to provide services to the device 110. Based on the time received by the controller 206, the controller 206 may cause the tuner 304 to stop scanning if the controller 206 determines that the maintenance period is activated. Additionally, the controller 206 stores the currently-used RF communication channel frequency of the tuner 206 in memory 218 before entering the maintenance period. As will be described below, when the maintenance period is over, the controller 206 retrieves the last known channel frequency from the memory 218 and provides the last known channel frequency to the tuner 304 to resume scanning. In some embodiments, the web server 306 may notify connected browsing sessions, e.g., computer 112, laptop computer 118, etc., that Internet service is temporarily unavailable during the maintenance period. The notification from the web server 306 may be transmitted to the various devices via, for example, WiFi modules 210, 212, MoCA circuit 207 and/or Ethernet switch 208.

A method 400 for entering a standby mode in a customer premise equipment (CPE) device in a data over cable system interface specification (DOCSIS) network in accordance with an embodiment of the present disclosure will now be described in relation to FIGS. 3, 4, and 5.

Figure 5:
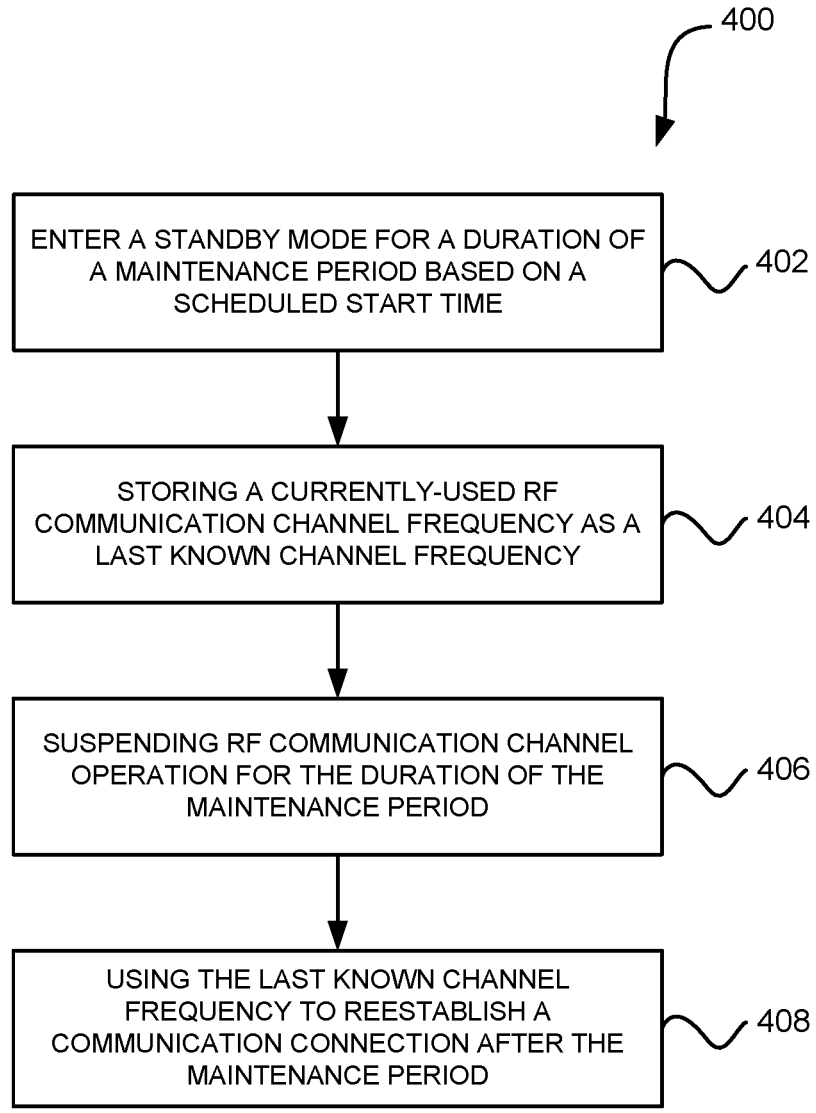
FIG. 5 is a flowchart of an exemplary method for entering a standby mode in a customer premise equipment (CPE) device in a data over cable system interface specification (DOCSIS) network in accordance with an embodiment of the present disclosure.

In step 402 of FIG. 5, the controller 206 enters a standby mode for the electronic device 110 for a duration of a maintenance period. In standby mode, periodic ranging of the DOCSIS protocol will be suspended, i.e., a constant handshake that takes place so that the power levels and timing relative to other devices and the headend or CMTS 106 are kept in synchronization is suspended, minimizing the processing that is typically required to decode the incoming TDM (time division multiplexed) signal received from the headend or CMTS 106 during a non-maintenance period. Internet access will not be available during the maintenance period; however, the local routing functions will be maintained for the Ethernet 208, WiFi 210, 212 and MoCA 207 interfaces. The voice interface, i.e., eMTA 216, will unregister with a telephony host prior to the maintenance period, and will re-register once wide area network (WAN) access is re-established. The controller 206 determines when to enter the standby mode based on a time received from the real-time clock 302. Either upon entering the standby mode or just before entering the standby mode, the controller 206 queries the tuner 304 to determine a currently-used RF communication channel frequency and stores same as a last known channel frequency into non-volatile memory 218, in step 404. Next, in step 406, the controller 206 suspends RF communication channel operation between the electronic device 110 and an upstream content distribution device for the duration of the maintenance period. It is to be appreciated that when the RF communication channel operation is suspended, no handshaking occurs between the device 110 and other devices and no TDM signal that needs to be decoded is received. When the maintenance period is over, the controller 206 retrieves the last known channel frequency from the memory 218 and provides the last known channel frequency to the tuner 304 to resume scanning to reestablish a communication connection between the electronic device 110 and the upstream content distribution to return to a normal operating state, at step 408. Using the last known channel frequency avoids scanning for a RF communication channel to reestablish a communication connection, for example, between a cable modem 18 and the cable modem termination system 16.

A method 500 for performing maintenance in a customer premise equipment (CPE) device in a data over cable system interface specification (DOCSIS) network in accordance with an embodiment of the present disclosure will now be described in relation to FIGS. 1, 3, 4, and 6A-6B.

Figure 6A:
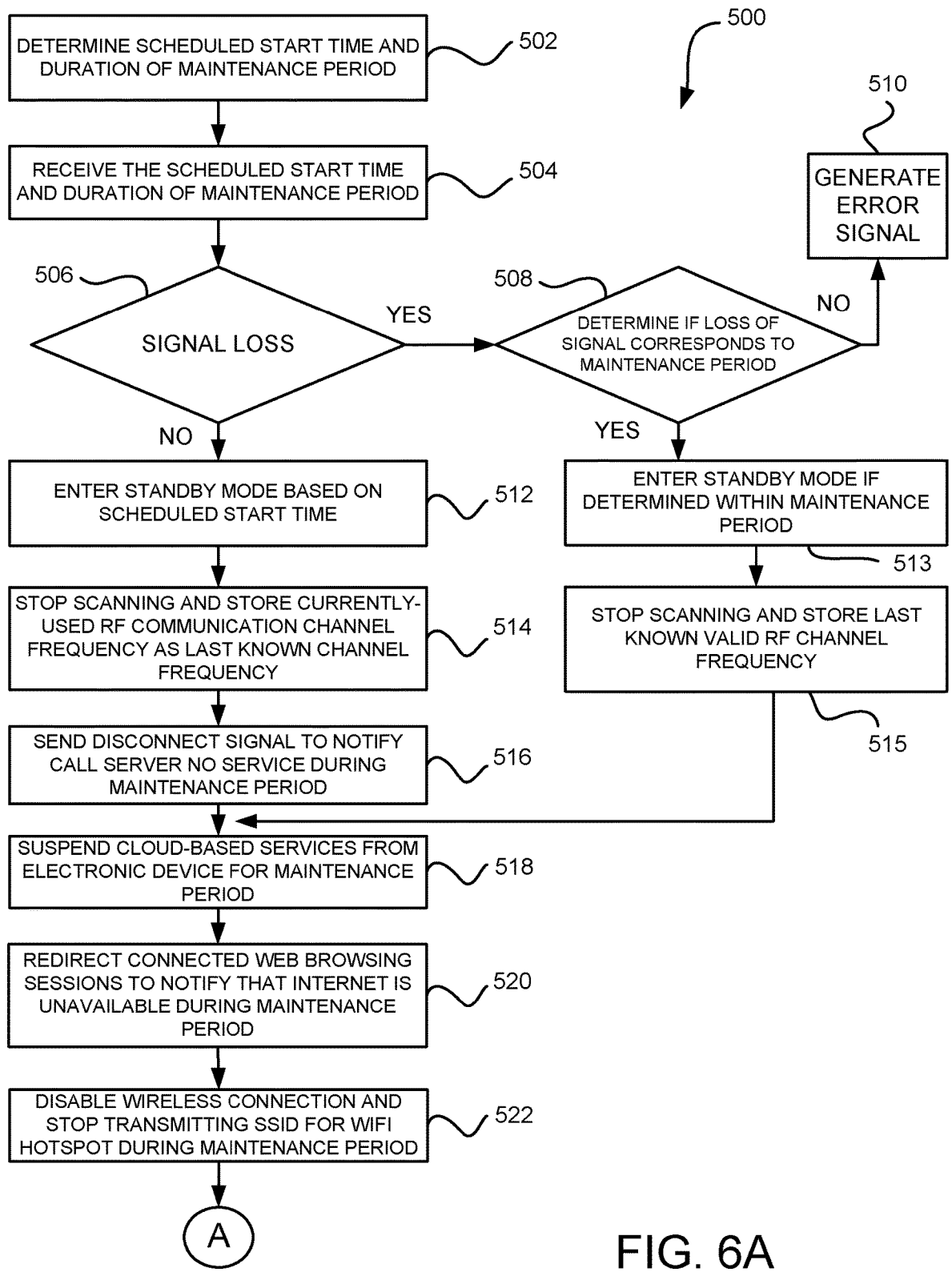
FIG. 6A and FIG. 6B illustrate an exemplary method for performing maintenance in a customer premise equipment (CPE) device in a data over cable system interface specification (DOCSIS) network in accordance with an embodiment of the present disclosure.

In step 502 of FIG. 6A, a service provider determines a need for maintenance in at least one CPE device, e.g., gateway 110, set-top box 122, etc. as shown in FIG. 2, and determines a scheduled start time and duration of the maintenance period, for which the CPE device will be placed in standby mode. In step 504, controller 206 receives the start time and duration of the maintenance period from the OSS servers 22. In step 506, the controller 206 determines if there is a signal loss.

If, in step 506, the controller 206 determines that the signal is good or present, the method goes to step 512. Using the internal real-time clock 302, the controller enters the standby mode based on the scheduled start time, in step 512. At step 514, upon entering the standby mode, the controller 206 will cause the tuner 306 to stop scanning for the DOCSIS signal and store the currently-used RF communication channel frequency as the last known channel frequency in memory 218. During the standby mode, the controller 206 proceeds to suspension services provided by the device 110. For example, in step 516, the controller 206 instructs the eMTA 216 to notify a call server that the device 110 is going out of service and will suspend telephony service by sending a disconnect signal to the call server. Optionally, the eMTA 216 may provide a response to an off-hook condition with a tone or pre-recorded message in place of a dial tone, when the eMTA 216 is in the standby mode. In step 518, the controller 206, via the internal web server 306 and the Internet 314, may notify cloud-based server 326 that device 110 will be unavailable during the maintenance period and subsequently suspends cloud-based service access provided by the electronic device 110 during the maintenance period. In step 520, the web server 306 may redirect browser traffic to notify connected browsing sessions, e.g., computer 112, laptop computer 118, etc., that Internet service is temporarily unavailable during the maintenance period, based on a message that the service provider specifies. In one embodiment, the service provider may specify the message via SNMP MIB objects or TR-069 data models. An exemplary message may read: 'Sorry for the inconvenience, the system will be temporarily unavailable from 01:00 through 03:00 on Apr. 15, 2018. Your Service Provider'. The notification from the web server 306 may be transmitted to the various devices via, for example, WiFi modules 210, 212 and/or Ethernet switch 208. Lastly, in step 522, the controller 206 may disable the service set identifier (SSID) for an associated WiFi hotspot, e.g., WiFi modules 210, 202, and stop transmitting the SSID for the duration of the outage to disable the wireless connection. It is to be appreciated that a hotspot is typically identified with the operator in the SSID, and a WiFi radio can broadcast multiple SSID per radio (e.g., 8 and 16 are common for advanced chip sets) and only the hotspot SSID would stop broadcasting, while the homeowner's SSID would still be available for LAN communications. It is to be appreciated that other services provided by device 110 may be suspended or stopped during the maintenance period or standby mode and the above is merely exemplary. Furthermore, it is to be appreciated that the steps described above may be performed in an order different than shown in FIGS. 6A and 6B.

Figure 6B:
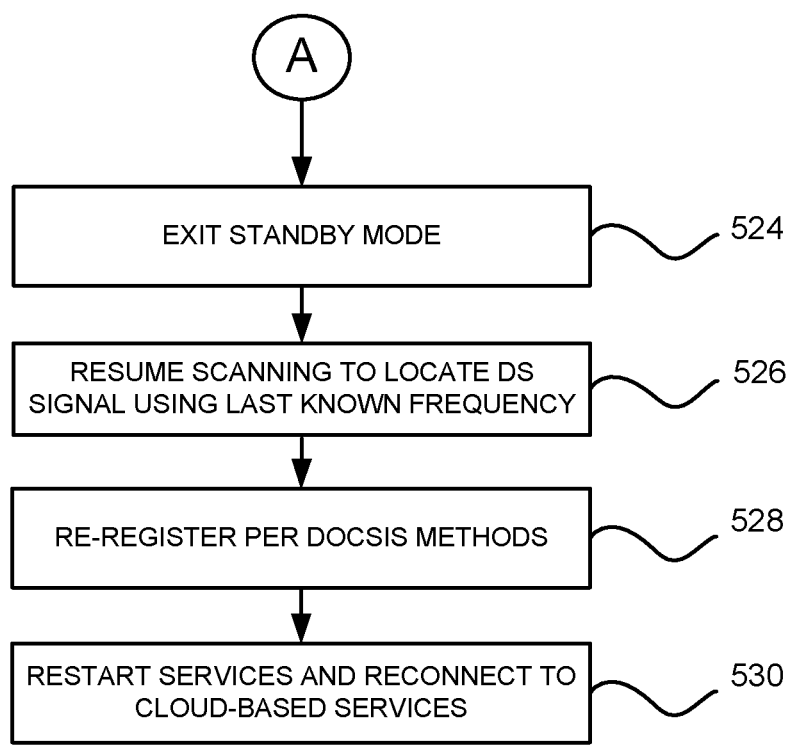

In step 524 of FIG. 6B, the controller determines when to exit the standby mode based on the duration of the maintenance period and time provided by the real-time clock 302. When the maintenance period is over, the controller 206 retrieves the last known channel frequency from the memory 218 and provides the last known channel frequency to the tuner 304 to resume scanning to reestablish a communication connection between the electronic device 110 and the upstream content distribution, in step 526. Next, in step 528, the controller 206 will attempt to locate the downstream (DS) signal, i.e., from the headend/CMTS 106 to the electronic device 110, and re-register with the headend/CMTS 106 per DOCSIS methods. When the device 110 is reregistered, the controller 206 restarts all services and reconnects to cloud-based services to return the device 110 to the normal operating state, in step 530.

Referring back to step 506 of FIG. 6A, if it is determined that the signal was lost, the controller 206 determines if the signal loss corresponds to the maintenance period using the real-time clock 302, in step 508. If the device is not in the maintenance period, the controller 206 generates an error signal, in step 510. If, in step 508, the controller 206 determines that the device is in the maintenance period based on the previously received scheduled start time and duration, the controller 206 enters the standby mode, in step 513. At step 515, upon entering the standby mode, the controller 206 will cause the tuner 306 to stop scanning for the DOCSIS signal and store in memory 218 the last known RF communication channel frequency that was used before the loss of the signal. In certain embodiments, the controller 206 may continuously store or retain in memory the most recently used valid RF communication channel frequency, and therefore, step 515 may include a check or confirmation that the last known valid frequency was stored. Next, the controller 206 will proceed to suspend services provided by the device 110 in steps 518, 520 and 522 as described above. It is to be appreciated that the controller 206 may skip step 516, in this scenario, since the controller 206 can not send a disconnect signal to the call server if there is a signal loss. After step 522, the controller 206 will proceed through steps 524 through 530 as described above.

Using the techniques described above, an electronic device on a DOCSIS network uses the last known channel frequency to avoid scanning for a RF communication channel to reestablish a communication connection after a maintenance interval, for example, between a cable modem 18 and the cable modem termination system 16. As described above, the cable modem or cable modem components may be part of a gateway, set-top box (STB), etc. Using the techniques of the present disclosure, an electronic device enters a standby mode, based on a scheduled start time, to perform maintenance and recovers from the standby mode more efficiently and with less service disruptions.

According to one aspect of the present disclosure, a method is provided including entering a standby mode for an electronic device for a duration of a maintenance period; storing a currently-used RF communication channel frequency as a last known channel frequency into non-volatile memory; suspending RF communication channel operation between the electronic device and an upstream content distribution device for the duration of the maintenance period; and using the last known channel frequency to reestablish a communication connection between the electronic device and the upstream content distribution device after the maintenance period.

In another aspect, suspending RF communication channel operation between an electronic device and an upstream content distribution device includes suspending RF communication between a cable modem termination system and a cable modem during a maintenance period in a Data over Cable Service Interface Specification (DOCSIS) network.

In a further aspect, using the last known channel frequency to reestablish a communication includes using a stored frequency of a cable modem termination system to reestablish a communication between a cable modem termination system and a cable modem during the maintenance period.

In another aspect of the method, suspending RF communication channel operation includes entering a standby mode, performed by a cable modem, after receiving a start time and a duration for a maintenance period communicated by a cable modem termination system to the cable modem.

In still another aspect, using the last known channel frequency avoids scanning for a RF communication channel to reestablish a communication connection between the cable modem and the cable modem termination system.

In yet another aspect, the method further includes redirecting browser traffic to an internal server of the electronic device which informs that a maintenance period outage is in progress during the maintenance period.

In another aspect, the method further includes disabling a wireless connection in the electronic device to the Internet during the maintenance period.

In one aspect, the electronic device is a cable modem and the cable modem stops transmitting a service set identifier (SSID).

In a further aspect, the method further includes suspending cloud-based service access provided by the electronic device during the maintenance period.

In yet another aspect, the method further includes sending a disconnect signal to a call server from the electronic device to suspend telephony service provided by the electronic device from an embedded media terminal adapter (eMTA) of the electronic device.

In still a further aspect, the method further includes providing a response to an off-hook condition with a tone or a pre-recorded message in place of a dial tone.

In one aspect, the electronic device is at least one of a cable modem (CM), a gateway and/or a set-top box (STB).

According to another aspect of the present disclosure, a device is provided including a controller that enters a standby mode for a duration of a maintenance period; and a tuner that determines a currently-used RF communication channel frequency and stores the currently-used RF communication channel frequency as a last known channel frequency into non-volatile memory; wherein the controller suspends RF communication channel operation with an upstream content distribution device for the duration of the maintenance period, and the tuner uses the last known channel frequency to reestablish a communication connection with the upstream content distribution device after the maintenance period.

In one aspect, the controller suspends RF communication between a cable modem termination system and a cable modem during the maintenance period in a Data over Cable Service Interface Specification (DOCSIS) network.

In another aspect, the tuner uses a stored frequency of a cable modem termination system to reestablish a communication between a cable modem termination system and a cable modem during the maintenance period.

In a further aspect, the controller enters the standby mode, after receiving a start time and a duration for the maintenance period communicated by a cable modem termination system.

In still a further aspect, the tuner uses the last known channel frequency to avoid scanning for a RF communication channel to reestablish a communication connection between the cable modem and the cable modem termination system.

In yet another aspect, the device further includes an internal server that informs browser traffic that a maintenance period outage is in progress during the maintenance period.

In one aspect, the controller disables a wireless connection to the Internet during the maintenance period.

In another aspect, the device is a cable modem and the cable modem stops transmitting a service set identifier (SSID).

In a further aspect, the controller suspends cloud-based service access during the maintenance period.

In another aspect, the device further includes an embedded media terminal adapter (eMTA) that sends a disconnect signal to a call server to suspend telephony service provided by the device.

In yet another aspect, the embedded media terminal adapter (eMTA) provides a response to an off-hook condition with a tone or a pre-recorded message in place of a dial tone.

In still another aspect, the device is at least one of a cable modem (CM), a gateway and/or a set-top box (STB).

It is to be appreciated that the usage of "and/or" in a list including two or more limitations or elements, as used herein, is intended to refer to all permutations and combinations of the listed two or more limitations. For example, "A, B, and/or C", is intended to include at least one of: A, B, C, AB, AC, BC, or ABC, and if order is important in a particular context, also BA, CA, CB, CBA, BCA, ACB, BAC, or CAB.

It is to be appreciated that the various features shown and described are interchangeable, that is a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described embodiments of devices, systems and methods for performing maintenance in DOCSIS network CPE devices and for improving recovery to a normal operating state from the maintenance, it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method comprising:
    upon a scheduled start time of a time period, suspending RF communication channel operation between a cable modem and a cable modem termination system;
    at the end of the time period, using a previously operational RF communication channel to reestablish a communication connection between the cable modem termination system and the cable modem;
    wherein suspending RF communication comprises entering a standby mode, performed by the cable modem, based on a start time and a duration for a maintenance period communicated by the cable modem termination system to the cable modem.

2. The method of claim 1, wherein suspending RF communication channel operation between the cable modem and the cable modem termination system comprises suspending RF communication between the cable modem termination system and the cable modem during the maintenance period in a DOCSIS network.

3. The method of claim 1, wherein using a previously operational RF communication channel to reestablish a communication comprises using a stored operational frequency of the cable modem termination system to reestablish a communication between the cable modem termination system and the cable modem during the maintenance period.

4. The method of claim 1, wherein using a previously operational RF communication channel comprises using a last known channel frequency of the communication modem termination system whereby scanning for a RF communication channel to reestablish a communication connection between the cable modem and a head-end is avoided.

5. The method of claim 1, further comprising redirecting browser traffic to an internal server of the cable modem which informs that a maintenance period outage is in progress during the maintenance period.

6. The method of claim 1, further comprising disabling wireless connection in the cable modem to internet service during the maintenance period.

7. The method of claim 6, wherein the cable modem stops transmitting a service set identifier.

8. The method of claim 1, further comprising suspending cloud-based service access provided by the cable modem during the maintenance period.

9. The method of claim 1, further comprising sending a disconnect signal to a call server from the cable modem to suspend telephony service provided by the cable modem from an embedded media terminal adapter (eMTA) of the cable modem.

10. The method of claim 9, further comprising providing a response to an off-hook condition with a tone or a pre-recorded message in place of a dial tone.

11. An electronic device comprising:
- a controller that, upon a scheduled start time of a time period, directs the suspension of RF communication channel operation between the electronic device and a cable modem termination system;
- a tuner that, at the end of the time period, uses a previously operational RF communication channel to reestablish a communication connection between the cable modem termination system and the electronic device;
- wherein the controller enters a standby mode based on a start time and a duration for a maintenance period communicated by the cable modem termination system to the electronic device.

12. The electronic device of claim 11, wherein the electronic device is one of a cable modem, a gateway, or a set-top box.

13. The electronic device of claim 11, wherein the controller of directs the suspension of RF communication between the cable modem termination system and the electronic device during the maintenance period in a DOCSIS network.

14. The electronic device of claim 11, wherein the tuner uses a stored operational frequency of the cable modem termination system to reestablish a communication between the cable modem termination system and the electronic device during the maintenance period.

15. The electronic device of claim 11, wherein the tuner uses a last known channel frequency of the communication modem termination system whereby scanning for a RF communication channel to reestablish a communication connection between the electronic device and a head-end is avoided.

16. The electronic device of claim 11, wherein the controller redirects browser traffic to an internal server of the electronic device which informs that the maintenance period outage is in progress during the maintenance period.

17. The electronic device of claim 11, wherein the controller sends a disconnect signal to a call server from the electronic device to suspend telephony service provided by the electronic device from an embedded media terminal adapter (eMTA) of the electronic device.

18. The electronic device of claim 11, wherein the controller provides a response to an off-hook condition with a tone or a pre-recorded message in place of a dial tone.

* * * * *